United States Patent Office 3,205,210
Patented Sept. 7, 1965

3,205,210
CATALYST SOLUBILIZING AGENTS
Thomas B. Junas and John M. Hoyt, Cincinnati, Ohio, assignors to National Distillers and Chemical Corporation, New York, N.Y., a corporation of Virginia
No Drawing. Filed May 2, 1962, Ser. No. 191,702
12 Claims. (Cl. 260—93.7)

This invention relates to a method of removing ash from low pressure hydrocarbon polymers. More particularly it relates to a process of this nature utilizing a small amount of a branched chain alkyl primary amine.

It is well known in the art to polymerize and copolymerize alpha olefins and diolefins at low pressures with catalyst systems containing a partially reduced, heavy transition metal halide and a reducing metal-containing compound. In general, these catalyst systems are of the Ziegler-type which comprise, in combination, (I) a reducing agent (generally called a cocatalyst) as, for example, an element from Groups IA, IIA, and IIIA, inclusive, of the Periodic Table ("Handbook of Chemistry and Physics," 42nd ed., 1960, pp. 448–449, Chemical Rubber), a metal alkyl, a metal alkyl hydride, a metal alkyl halide, mixtures thereof, etc., and (II) a halide of a transition metal from Groups IVB, VB and VIB, inclusive, of the Periodic Table. The combination catalyst is generally used in an amount of from about 0.01 to about 2.0 weight percent, based on the weight of the monomeric reactant subjected to the polymerization, or copolymerization; and regarding the relative proportions of the reducing agent to the transition metal halide in the combination catalyst, said catalyst generally comprises, in mole ratio, one mole of the transition metal halide to from about 0.5 to about 15 moles of the reducing agent.

In further reference to the Ziegler-type catalyst, specific examples of the cocatalyst component (reducing agent) include the elements such as sodium, lithium, magnesium, aluminum, zinc, etc.; metal alkyls such as triethylaluminum, triisobutylaluminum, dibutylmagnesium, dibutylcadmium, diethylzinc, n-butyllithium; metal alkyl hydrides such as diethylaluminum hydride, butylmagnesium hydride, including such hydrides normally present in aluminum alkyls; and metal alkyl halides such as the sesquichlorides (mixtures of alkylaluminumdichloride and dialkylaluminumchloride), diethylaluminum chloride, butylmagnesium chloride, dibutylaluminumiodide, and others.

The other component of the combination catalyst, namely a halide-containing compound of the aforesaid transition metals, is generally a chloride thereof, although other halides such as the bromides, iodides, etc. may be used. Of such metals, the halides of titanium, vanadium and molybdenum are preferred, but halides of other metals such as those of niobium, zirconium, tungsten, and others, may be used. More specific examples of halides of the aforesaid transition metals useful for practice of this invention include $VCl_4$, $TiCl_4$, $VOCl_3$, $TiCl_3$, $NbCl_5$, $MoO_2Cl_2$, and mixtures thereof.

More specific examples of the combination catalyst embodied for use herein include vanadium tetrachloride with triethylaluminum, and titanium trichloride with triethylaluminum.

Although the Ziegler-type catalysts embodied for use herein comprise a reducing agent and a halide-containing compound of the aforesaid transition metal, such catalysts can also contain additional ingredients. Thus, for example, such catalysts may contain a combination of a halide of such a transition metal and an oxyhalide of the aforesaid transition metals (e.g., $VOCl_3$) and, in further example, in combination with vanadium tetrachloride or titanium tetrachloride along with a reducing agent (e.g., trialkylaluminum).

The alpha olefin feeds utilized in polymerization and copolymerization include ethylene, propylene, butene-1, heptene-1, dodecene-1, etc. with ethylene and propylene preferred. Diolefins which can be used in copolymerization include butadiene, isoprene, piperylene, vinylcyclohexene, cyclopentadiene, 1,4-pentadiene, etc. It is to be understood that the term "polymer" as used herein includes both homo- and copolymers.

One of the problems associated with the use of the above-described catalyst systems is the ash introduced into the polymer from the metal-bearing catalyst components. While the ash content is dependent upon the catalyst efficiency, it generally ranges from about 1 to 3 wt. percent as determined by an ignition technique (dry ash). At these levels, it tends to impart undesirable color and corrosivity behavior in the polymer during subsequent processing and use.

In carrying out a polymerization using these catalyst systems, the monomers are generally contacted with the catalyst in the presence of an inert hydrocarbon diluent such as Decalin, heptane, hexane, isopentane, benzene, and the like. The polymerization temperature ranges from about 0° to 250° C.; the polymerization pressure ranges from about 0 to 5000 p.s.i.g., usually 0 to 3000 p.s.i.g. The catalyst concentration in the polymerization zone is preferably in the range of about 0.1 to 0.5 wt. percent based on total liquid and the polymer concentration in the polymerization zone is preferably maintained between about 2 to 20% based on total contents so as to allow easy handling of the polymerized mixture. When the desired degree of polymerization has been reached, a non-solvent for the polymer, e.g., methanol, ethanol, n-propanol, isopropanol, butanol, and the like, can be added to the reaction mixture to precipitate the polymer from solution. Such a precipitated polymer generally retains undesirable quantities of catalyst residues as reflected by a high ash value. Alternatively, a solvent for the catalyst can be contacted with the polymer under such conditions of elevated temperature and pressure that a homogeneous solution of polymer, polymer solvent, catalyst solvent, and solubilized catalyst results, and the solubilized catalyst then removed by adsorption on a solid adsorbent such as silica or alumina.

One object of this invention is to provide a novel and effective agent for removing ash from polymers.

Another object of this invention is to provide a novel and effective method for removing ash from polymers produced by means of Ziegler-type catalysts.

Other objects will become apparent from the ensuing description of the invention.

It has now been found that a metal-bearing catalyst residue can be effectively removed from a low pressure hydrocarbon polymer by contacting said polymer containing said residue with a branched chain alkyl primary amine in sufficient quantity to solubilize the metal-bearing residue and thereafter separating the solubilized metal-bearing residue from the polymer. It is especially surprising to find that branched chain alkyl primary amines solubilize the aforedescribed catalyst residues in view of the fact that straight chain alkyl primary amines as well as dialkyl secondary and trialkyl tertiary amines are practically ineffective for this purpose.

The branched chain alkyl primary amines especially suitable for practice of this invention contain branching on the carbon atom alpha to the amine group and are characterized by the formula:

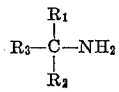

wherein $R_1$ and $R_2$ may be alkyl radicals of from about 1 to 22 carbon atoms, and $R_3$ may be hydrogen or an alkyl radical of from about 1 to 22 carbon atoms. Preferably, $R_1$ and $R_2$ are alkyl radicals of from about 1 to 4 carbon atoms and $R_3$ is hydrogen or an alkyl radical of from about 1 to 12 carbon atoms. Compounds such as isopropylamine, sec-butylamine, tert-butylamine, tert-octylamine (1,1-dimethyl-3,3-dimethylbutylamine), tert-nonylamine ($C_9H_{19}NH_2$), tert-decylamine ($C_{10}H_{21}NH_2$), tert-dodecylamine ($C_{12}H_{25}NH_2$), tert-tetradecylamine $$(C_{14}H_{29}NH_2)$$

tert-octadecylamine ($C_{18}H_{37}NH_2$), tert-docosylamine $$(C_{22}H_{45}NH_2)$$

and mixtures thereof are included. Particularly preferred compounds for this process are isopropylamine, tert-butylamine, and tert-octylamine.

In carrying out the process of this invention, a polymer as produced by the aforedescribed polymerization process and contaminated with metal-bearing catalyst residues can be contacted with the branched chain alkyl primary amine prior to the filtration or other separation of the polymer or subsequent thereto. In both cases the subject amine can be utilized alone or in combination with other washing or solubilizing agents such as alkanols.

Generally a sufficient amount of the branched chain alkyl primary amine is employed to insure a substantially complete treatment of the heavy metal catalyst residues in the polymer. The amount of the amine utilized is small, i.e. in the range of about 0.5 to 10 moles per equivalent of total catalyst and cocatalyst, and preferably about 1 to 3 moles, i.e. for a mixture of 1 mole of triethylaluminum and 1 mole of $TiCl_3$, from 3 to 60 moles and preferably from 6 to 18 moles of amine.

Separation of the solubilized catalyst residue from the polymer is readily accomplished either before or after precipitation of the polymer. For example, the branched chain alkyl primary amine can be introduced into a solution of polymer in an inert liquid hydrocarbon containing the catalyst residues to react with the catalyst residues to form a complex which is miscible with the polymer solution. Temperatures ranging from about 95° to 250° C. are ordinarily required to maintain the polymer and solubilized catalyst residues in solution. Sufficient positive pressure is required to maintain the components of the solution in the liquid phase; pressures in the range of 15 p.s.i. to 3000 p.s.i. have been found to be particularly satisfactory. The solution is then contacted under the abovementioned conditions with an adsorbent capable of selectively adsorbing the solubilized catalyst residues. Suitable adsorbents include silica, alumina, fuller's earth, and bauxite. Following treatment with the adsorbent, the polymer, substantially free of contamination by catalyst residues, may be isolated by precipitation, as by cooling or addition of a suitable non-solvent, e.g. an alcohol such as methanol, ethanol, n-propanol, isopropanol, n-butanol, etc., followed by filtration.

When the solubilized catalyst residues are separated from the polymer subsequent to the precipitation of the polymer, the mixture of polymer and catalyst residues may be treated with the branched chain alkyl primary amine when the polymer is in solution in an inert liquid hydrocarbon solvent, as aforedescribed, or when it is present as a slurry in a hydrocarbon diluent. It is generally convenient to perform these treatments using the same hydrocarbons employed during the polymerization step. When treating the polymer as a slurry, it is preferred to increase contact between the contaminated polymer and the amine by vigorous agitation or stirring. Treatment of the polymer as a slurry is not restricted to the elevated temperatures and pressures required for treatment of the polymer in solution. For example, such treatment may be effected at room temperature and atmospheric pressure, if desired, although it is preferable to carry out the treatment in the range of about 40° to 80° C. Precipitation of the treated polymer may be completed by adding an excess of a non-solvent for the polymer, such as an alkanol. Alternatively, the amine may be introduced concurrently with, or in admixture with, the non-solvent to carry out precipitation and catalyst removal in one step.

The resultant precipitate of polymer may then be separated by filtration, centrifugation, or the like from the polymer solvent wherein is contained substantially all of the catalyst residues in solubilized form. After separation, the solid polymer, which is substantially free of catalyst residues, may be further washed with an alcohol or acid, such as hydrochloric acid, dried, compacted and packaged.

The invention will be more fully understood by reference to the following illustrative examples. In these examples the polymerization was carried out in a 500-ml. three necked Morton flask modified with a bottom draw-off, a side tube for injecting catalyst solutions through a rubber serum cap, and a thermocouple well. The flask was equipped with a heating mantle, a mechanical stirrer, a solvent inlet, a propylene inlet, a mercury monometer and a vent. The propylene pressure was maintained at 60 mm. Hg (gage) in the reactor by means of a reducing valve in the propylene line.

*Example I*

In the reactor was placed 250 ml. purified Decalin. The Decalin was heated to 100° C. and then saturated with propylene. 6.5 ml. of a 0.5 M solution of triethylaluminum in purified Decalin was injected followed by 6.5 ml. of a 0.5 M suspension of $TiCl_3$ in Decalin (the $TiCl_3$ had been ground with steel balls in Decalin prior to use). Polymerization started at once and was continued for 20 minutes, maintaining the reactor temperature at 100° C. and the reactor pressure at 60 mm. Hg (gage).

The contents of the reactor were then transferred without delay to another flask similar to the above-described reactor, under a $N_2$ blanket. 6.5 of redistilled tert-octylamine was added. The resultant solution was allowed to cool, gradually with stirring, to room temperature. During this period the polymer precipitated. The Decalin-polymer slurry was then removed from the bottom of the second flask into a covered, $N_2$-blanketed sintered glass filter. The white polymer was collected, washed with 250 ml. of cold purified Decalin, and dried in vacuum at 60° C. 15.5 g. of white, solid polymer was isolated. The ash content of the dried polymer was 0.68% by weight.

The filtrate was heated at 100° C. for 1 hour with 30 g. of silica gel which had been activated by heating for several hours at 475° F. A color change in the filtrate from yellow to colorless was noted during this treatment. Before the silica gel treatment the filtrate contained 213 p.p.m. Ti and 130 p.p.m. Al. After treatment it contained 10 p.p.m. Ti and 5 p.p.m. Al, demonstrating that the solubilized residues are adsorbable on silica gel.

In contrast, a second polymerization carried out exactly as that above, except that the addition of a solubilizing agent was omitted, upon absorption of 17.6 g. of propylene yielded 16.7 g. of a polymer having an ash content of 1.57 wt. percent. Before drying the polymer was a deep purple; after drying, it was white.

*Example II*

Various aliphatic amines were compared in controlled experiments designed to determine the ability of such amines to effect removal of Ziegler-type catalyst residues by solubilization from olefinic polymers. In each experiment, 0.5 ml. of the amine was contacted, under nitrogen, in a glass tube with 10 ml. of a Decalin suspension containing 0.1 mM. of $TiCl_3$ and 0.1 mM. aluminum triethyl per liter. The tube was sealed, and then heated with agitation to 130° C. The observed behaviors are noted in the following table.

Table

| Amine | Appearance Upon Heating to 130° C. |
|---|---|
| None | Voluminous black precipitate in yellow solution. |
| Tert-octylamine | Clear, yellow-brown solution. |
| Isopropylamine | Clear, dark brown solution. |
| Tert-butylamine | Clear, dark yellow-brown solution. |
| Propylamine | Yellow precipitate in yellow liquid. |
| Butylamine | Gelatinous blue precipitate. |
| Hexylamine | Blue-black suspension. |
| Dipropylamine | Black precipitate in brown liquid. |
| Tributylamine | Black gum in yellow liquid. |
| N,N'-diethyldodecylamine | Black precipitate. |

As seen from the above examples, the branched chain alkyl primary amines are effective in reducing the ash content of commercially important low pressure olefin polymers. This finding was both surprising and unexpected in view of the failure of closely related alkyl amines to solubilize the catalyst residues. Furthermore, only small amounts of the amines are required, and the amines are readily available in commercial quantities and are inexpensive.

This invention is not intended to be limited to the specific examples which have been presented merely as illustrations. Modifications and variations may be made without departing from the scope of the invention.

What is claimed is:

1. A method of removing ash from a normally solid, polymerized alpha olefin product prepared with a heavy metal catalyst formed by admixing a strong reducing agent selected from the group consisting of Group I-A, II-A and III-A metals, metal alkyls, metal alkyl hydrides, metal alkyl halides with halides of a transition metal selected from the group consisting of the group IV-B, V-B and VI-B metals of the periodic system which consists essentially of contacting the polymerization product containing polymer and catalyst residues with a minor amount of a branched chain alkyl primary amine having the formula

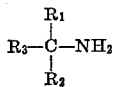

wherein $R_1$ and $R_2$ are alkyl groups of about 1 to 22 carbon atoms and $R_3$ is selected from the group consisting of hydrogen and an alkyl group of about 1 to 22 carbon atoms and then separating the solubilized residue from the polymer.

2. The process of claim 1 in which the branched chain alkyl primary amine is utilized in an amount of from about 0.5 to 10 moles per equivalent of catalyst employed.

3. The method of claim 1 in which the temperature of contacting is about 20° to 250° C.

4. The method of claim 1 in which the polymerized product is polypropylene.

5. The method of claim 1 in which the branched chain alkyl primary amine is tert-octylamine.

6. The method of claim 1 in which the branched chain alkyl primary amine is isopropylamine.

7. The method of claim 1 in which the branched chain alkyl primary amine is tert-butylamine.

8. The method of claim 4 in which the polypropylene is prepared in the presence of a catalyst formed by admixing an aluminum alkyl with a titanium salt.

9. The method of claim 1 in which the polymer is precipitated prior to the separation of the solubilized catalyst residue.

10. A method of removing ash from normally solid polymerized alpha olefin product prepared in the presence of a catalyst containing a partially reduced titanium halide and an aluminum alkyl compound which consists essentially of contacting the polymerization product containing polymer and catalyst residues with a minor amount of a branched chain alkyl primary amine selected from the group consisting of tert-octylamine, isopropylamine, and tert-butylamine.

11. The method of claim 10 in which the titanium halide is titanium trichloride and the aluminum alkyl compound is aluminum triethyl.

12. The method of claim 1 wherein $R_1$ and $R_2$ are alkyl groups of about 1 to 4 carbon atoms.

References Cited by the Examiner

UNITED STATES PATENTS

| 2,890,214 | 6/59 | Brightbill et al. | 260—94.9 |
| 2,908,675 | 10/59 | Lindland | 260—94.9 |
| 3,012,022 | 12/61 | Reed et al. | 260—94.9 |

JOSEPH L. SCHOFER, *Primary Examiner.*